Aug. 14, 1951  O. H. SIMMONS  2,563,968
INFLATION GAUGE AND VALVE ASSEMBLY
Filed March 15, 1949
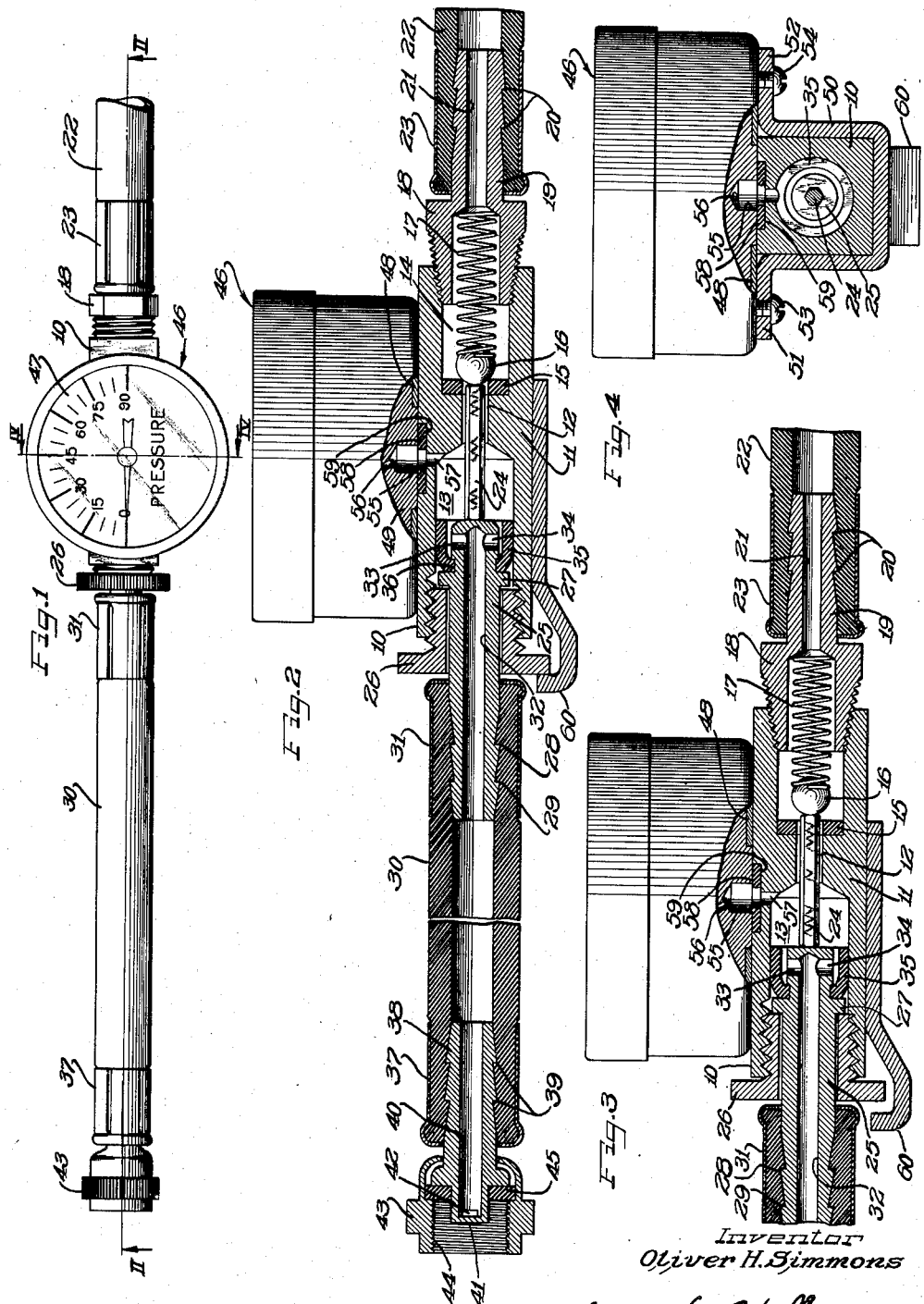
Inventor
Oliver H. Simmons
By The Firm of Charles W. Hills
Attys Patented Aug. 14, 1951

2,563,968

UNITED STATES PATENT OFFICE 2,563,968

INFLATION GAUGE AND VALVE ASSEMBLY

Oliver H. Simmons, Chicago, Ill., assignor to Roy D. Buell, Chicago, Ill.

Application March 15, 1949, Serial No. 81,580

3 Claims. (Cl. 137—69.5)

The present invention relates to a valve and gauge assembly for regulating the flow of fluids under pressure and for determining the pressure level present in the system.

An object of the present invention is to provide a simple, compact assembly for supplying air pressure to automobile inner tubes and the like.

Another object of the present invention is to provide a valve and gauge assembly which may be attached to the valve stem of an ordinary inner tube for supplying air pressure thereto, without the necessity of removing the assembly from attachment with the valve stem in order to take readings of air pressure.

Another object of the present invention is to provide a valve and gauge assembly which may be easily constructed from inexpensive parts.

Further objects and features of the present invention will become apparent from the following description of the attached sheet of drawings, in which:

Figure 1 is a plan view of the valve and gauge assembly of the present invention;

Figure 2 is a cross-sectional view taken along the line II—II of Figure 1, showing the valve in closed position in the manner for taking a pressure reading;

Figure 3 is a view similar to Figure 2 and shows the valve in its open position providing for the flow of fluid under pressure through the valve assembly; and Figure 4 is a cross-sectional view of the assembly taken along the line IV—IV of Figure 1.

As shown on the drawings:

Reference numeral 10 denotes a valve body having a substantially rectangular cross section. The interior of the valve body 10 is formed into a partition 11 having an aperture 12 extending therethrough. The partition 11 separates a low pressure chamber 13 from a high pressure chamber 14 within the interior of the valve body. Bottomed against the partition 11 and surrounding the aperture 12 on the high pressure side of the partition 11 is a resilient washer 15 which serves as a valve seat for a ball 16. The ball 16 is urged against the valve seat formed in the washer 15 by means of a spring 17 which acts against a nipple 18 in threaded engagement with one end of the valve body 10. The nipple 18 is formed into an adapter portion 19 having annular ridges 20 at spaced positions along its longitudinal axis. The interior of the adapter portion 19 is provided with a passageway 21 which is flared at its innermost end to receive the spring 17. The passageway 21 is supplied from a source of high fluid pressure, such as an air compressor, by means of the hose 22 which is held snugly against the adapter 19 by virtue of its contact with the hose-engaging ridges 20 and by the action of a crimped ferrule 23 at one end.

To unseat the ball 16 from the valve seat 15 and thus permit air from the high pressure zone 14 to flow through the valve assembly, a valve-actuating rod 24 is provided. The valve-actuating rod 24 is journaled in the partition 11 and freely slidable within the aperture 12. The actuating rod 24 has a non-circular cross-section and a thickness somewhat less than the diameter of the aperture 12, so that when the rod 24 unseats the ball 16, air or other fluid may flow through the aperture 12 over the surfaces of the rod 24. The other end of the valve-actuating rod 24 is contacted by a tube 25 which is slidably mounted within a knurled control knob 26 which is in threaded engagement with the valve body 10. An annular flange portion 27 of the tube 25 is bottomed against the innermost portion of the control knob 26 such that rotation of the control knob 26 advances the tube 25 into the interior of the valve body 10.

The tube 25 is formed into an adapter portion 28 having a series of spaced annular ridges 29 for engaging a flexible hose 30. The hose 30 is also provided with a crimped ferrule 31 which holds the hose 30 in snug engagement with the adapter portion 28 of the tube 25.

The tube 25 is provided with an inner passageway 32 which communicates with the low pressure chamber 13 by means of outwardly directed passageways 33 and 34. The forward end of the tube 25 is held in sealing relation in the valve body 10 by means of a slidable resilient plunger cup 35 which is held within a notch 36 formed in the tube 25.

At the opposite end of the flexible hose 30, which contains crimped ferrule 37, there is provided an adapter 38 having a series of annular ridges 39 for snugly engaging the hose 30. The adapter 38, containing an axial passageway 40, is formed into a terminal plunger 41 adapted to contact the core of a conventional valve stem to depress the same to permit the flow of fluid therethrough. A radial aperture 42 is provided within the plunger 41 to provide a path for fluid into the passage 40. A swivel nut 43 having threads 44 for engaging a standard valve stem is rotatably mounted about the neck of the adapter 38. A resilient gasket 45 is interposed between the swivel nut 43 and the adapter 38 to provide a seal against the leakage of fluid through the swivel nut 43.

In order to measure the fluid pressure in a system being supplied from the high pressure fluid source, a pressure gauge 46 is provided in the assembly. The pressure gauge 46 contains a face 47 having calibrations thereon, a case 48, and an inner body portion 49. The pressure gauge 46 is mounted to the assembly by means of a U-shaped strap 50 having outwardly extending flanges 51 and 52 secured to the inner body portion 49 by means of screws 53 and 54. The interior of the gauge 47 has a port 55 which communicates with an inlet 56 to a pressure registering device such as a Bourdon tube in the gauge assembly. The port 55 registers with an aperture 57 which extends from the low pressure chamber 13 through the valve body 10 to the outer surface of the valve body 10. To provide sealing between the gauge 46 and the valve body 10, a resilient gasket 58 is provided between the face of the gauge 46 and the valve body 10. The gasket 58 is compressed into a depression 59 in the uppermost face of the valve body 10 and surrounds the passageway 57. The U-shaped strap 50 is also provided with an outwardly extending finger-like flange portion 60 which serves to limit the extent to which the knurled control knob 26 may be withdrawn from the valve body 10.

The operation of the device is as follows. The swivel nut 43 is threaded onto the valve stem of the device to be pressurized, causing the plunger 41 to depress the valve core. When it is desired to take a reading of the pressure inside the system, the knurled control knob 26 is turned in a counterclockwise direction until it abuts the finger-like flange 60. In this condition, the ball 16 is seated securely within the seat provided by the resilient washer 15 and consequently there is no flow of fluid from the high pressure chamber 14 into the low pressure chamber 13. This condition is illustrated in Figure 2. The fluid pressure is admitted by means of the aperture 42, the passageway 40, hose 30, passageway 32, into the low pressure zone 13 through the passageways 33 and 34. The pressure in the low pressure chamber 13 is transmitted by means of the passageway 57 and port 56 to the pressure measuring means in the gauge 46.

After such a reading has been taken, the device can be connected to the high pressure line merely by rotating the control knob 26 in a clockwise direction. Such rotation causes the tube 25 to urge the valve actuating rod 24 against the ball 16, unseating the ball 16 from its seat against the resilient washer 15. This condition is best illustrated in Figure 3. The high pressure fluid then flows through the connecting hose 22, through the passage 21, into the high pressure chamber 14, through the aperture 12 over the surfaces of the actuating rod 24 into the low pressure chamber 13. The fluid then enters the passageways 33 and 34 which communicate with the passageway 40, and into the system to be pressurized through the aperture 42.

From the foregoing it will be apparent that I have herein provided a valve and gauge assembly which is simple and compact in construction and which permits pressure readings to be taken at desired intervals without the necessity of disconnecting the pressurizing line.

I claim as my invention:

1. A valve and gauge assembly comprising a hollow bar having an apertured partition therein for defining a low pressure chamber and a high pressure chamber at either side thereof, a resilient washer bottomed on one side of said partition and surrounding the aperture to form a valve seat, a ball adapted to be seated against said valve seat, a spring urging said ball against said seat, a nipple threaded into one end of said bar against said spring urging said ball against said seat and having a passage therethrough for connecting said high pressure chamber with a source of fluid pressure, a control knob threaded into the other end of said bar, a finger-like member secured to said bar for limiting the extent to which said control knob may be withdrawn from said bar, a tube having a flange bottomed against said control knob and having a passage therein communicating with said low pressure zone, an actuating rod extending through the aperture of said partition in contact with said tube for unseating said ball when said control knob is threaded into said bar, a passageway extending from said low pressure zone through said body portion, a resilient seal ring surrounding said passageway, and pressure measuring means secured to said bar engaging said seal ring and having an entrance port registering with said passageway to measure fluid pressure in said low pressure chamber.

2. A valve and gauge assembly adapted for use in inflating tires which comprises a hollow bar having flat exterior sides and an apertured partition therein inwardly from both ends thereof, a resilient washer bottomed on one side of said partition and surrounding the aperture to form a valve seat, a ball adapted to be seated on said seat, a spring urging said ball against said seat, a nipple threaded into one end of said bar against said spring, a hollow screw threaded into the other end of the bar, a tube slidable through said screw having a head in the bar for bottoming on said screw and a hose retaining portion extending beyond the screw, a flexible plunger cup slidable in said bar and carried by the head end of the tube, a pin extending through said partition between the ball and head end of the tube, a pressure gauge on one flat face of the bar having an entrance port bottomed on said face, said bar having a passageway connecting the space in the bar between the partition and cup with said port, a gasket surrounding said port, a U-shaped strap embracing said bar and having outturned flanges underlying said gauge, screws anchoring said flanges to said gauge for clamping the gauge on the bar and for loading said gasket to place the port and passageway in non-leaking relation, and a finger on said strap extending in front of the hollow screw to limit the unthreading thereof whereby threading of the hollow screw into the bar will move the tube into the bar for shifting the pin to unseat the ball for flow of fluid from the nipple through the tube while reverse rotation of the hollow screw will permit the ball to seat and subject the gauge to fluid pressure in the tube.

3. A valve and gauge assembly adapted for use in inflating tires which comprises a hollow bar having an apertured partition therein inwardly from both ends thereof, a resilient washer bottomed on one side of said partition and surrounding the aperture to form a valve seat, a ball adapted to be seated on said seat, a spring urging said ball against said seat, a nipple threaded into one end of said bar against said spring, a hollow screw threaded into the other end of the bar, a tube slidable through said screw having a head in the bar for bottoming on said screw and a hose-retaining portion extending beyond the screw, a pin extending through said partition between the ball and head end of the tube, a pressure gauge on one face of the bar having the entrance port bottomed on said face, said bar having a passageway connecting the space in the bar between the partition and said hollow screw with said port, a strap embracing said bar and having outturned flanges underlying said gauge, means for anchoring said flanges to said gauge for clamping the gauge on the bar to place the port and passageway in non-leaking relation, and a finger on said strap extending in front of the hollow screw to limit the unthreading thereof whereby threading of the hollow screw into the bar will move the tube into the bar for shifting the pin to unseat the ball for flow of fluid from the nipple through the tube while reverse rotation of the hollow screw will permit the ball to seat and subject the gauge to fluid pressure in the tube.

OLIVER H. SIMMONS.

REFERENCES CITED

The following references are of record in the file of this patent:

UNITED STATES PATENTS

| Number | Name | Date |
|---|---|---|
| 1,369,555 | Schweinert | Feb. 22, 1921 |
| 1,503,068 | Sladek | July 29, 1924 |
| 1,834,033 | Michelin | Dec. 1, 1931 |
| 1,933,610 | Wahl | Nov. 7, 1933 |